United States Patent
Mikijelj

(10) Patent No.: US 8,652,981 B2
(45) Date of Patent: Feb. 18, 2014

(54) DENSE SILICON NITRIDE BODY HAVING HIGH STRENGTH, HIGH WEIBULL MODULUS AND HIGH FRACTURE TOUGHNESS

(75) Inventor: Biljana Mikijelj, Cerritos, CA (US)

(73) Assignee: Ceradyne, Inc., Costa Mesa, CA (US)

( * ) Notice: Subject to any disclaimer, the term of this patent is extended or adjusted under 35 U.S.C. 154(b) by 406 days.

(21) Appl. No.: 12/657,455

(22) Filed: Jan. 21, 2010

(65) Prior Publication Data
US 2012/0190530 A1    Jul. 26, 2012

(51) Int. Cl.
*C04B 35/587*    (2006.01)

(52) U.S. Cl.
USPC ........................... 501/97.2; 501/97.3

(58) Field of Classification Search
USPC ................................. 501/97.2, 97.3
See application file for complete search history.

(56) References Cited

U.S. PATENT DOCUMENTS

| | | | | |
|---|---|---|---|---|
| 4,879,263 A | * | 11/1989 | Komeya et al. ............. | 501/97.2 |
| 5,030,599 A | | 7/1991 | Quadir et al. | |
| 5,100,847 A | * | 3/1992 | Li et al. ..................... | 501/97.2 |
| 5,173,458 A | * | 12/1992 | Nishioka et al. ............ | 501/97.3 |
| 5,449,649 A | | 9/1995 | Li et al. | |
| 5,637,540 A | * | 6/1997 | Li et al. ..................... | 501/97.2 |
| 5,759,933 A | * | 6/1998 | Li et al. ..................... | 501/92 |
| 6,242,374 B1 | * | 6/2001 | Komatsu .................... | 501/97.2 |
| 6,391,812 B1 | * | 5/2002 | Araki et al. ................ | 501/97.3 |
| 6,846,765 B2 | * | 1/2005 | Imamura et al. ............ | 501/97.2 |
| 7,129,191 B2 | * | 10/2006 | Bandyopadhyay et al. . | 501/97.2 |
| 7,749,932 B2 | * | 7/2010 | Fukudome et al. .......... | 501/97.2 |
| 7,968,484 B2 | * | 6/2011 | Becher et al. ............... | 501/97.2 |
| 8,071,495 B2 | * | 12/2011 | Pujari et al. ................ | 501/97.2 |
| 2003/0148870 A1 | * | 8/2003 | Araki et al. ................ | 501/97.2 |

FOREIGN PATENT DOCUMENTS

| | | | |
|---|---|---|---|
| JP | 09030866 | * | 2/1997 |
| JP | 11130543 | * | 5/1999 |
| WO | WO 2008/080058 A1 | | 7/2008 |

OTHER PUBLICATIONS

Becher, Paul F. et al, Effects Of Rare-Earth (RE) Intergranular Adsorption On The Phase Transformation, Microstructure Evolution, And Mechanical Properties In Silicon Nitride With $RE_2O_3$+MgO Additives: RE=La, Gd, and Lu, Journal Of the American Ceramic Society, 91 (7) 2328-2336 (2008).

Satet, Raphaelle et al, Influence Of The Rare-Earth Element On The Mechanical Properties of RE-Mg-Bearing Silicon Nitride, Journal of The Americam Ceramic Society, 88 (9) 2485-2490(2005).

Wachtman, "7.4 The Weibull Distribution," *Mechanical Properties of Ceramics*, New York, NY 1996; cover page, title page, table of contents, and pp. 92-101.

* cited by examiner

*Primary Examiner* — Karl Group
(74) *Attorney, Agent, or Firm* — C. Michael Geise

(57) ABSTRACT

Silicon nitride materials with high strength, fracture toughness values, and Weibull moduli simultaneously, due to unique large grain reinforcing microstructures and well engineered grain boundary compositions. The invention demonstrates that, surprisingly and contrary to prior art, a silicon nitride material can be made which simultaneously has high strength above about 850-900 MPa, a Weibull above about 15 and high fracture toughness (above about 8 and 9 MPa·m$^{1/2}$), and has reinforcing grains longer than 5 μm, typically longer than 10 μm in the microstructure without compromising its properties and reliability. The product of this invention can be processed using a variety of densification methods, including gas-pressure sintering, hot pressing, hot isostatic pressing, but is not limited to these, and does not require multiple heat treatments for all of these features to be achieved.

15 Claims, 1 Drawing Sheet

DENSE SILICON NITRIDE BODY HAVING HIGH STRENGTH, HIGH WEIBULL MODULUS AND HIGH FRACTURE TOUGHNESS

ORIGIN OF THE INVENTION

The invention described herein was made in the performance of work Under a U.S. Army contract No. W911QX-09-C-0069, and is subject to provisions of public law 96-517 (35 USC 202) in which the contractor has elected to retain title.

BACKGROUND OF THE INVENTION

1. Field of the Invention

This invention relates to dense, virtually pore free, sintered silicon nitride ceramic compositions having simultaneously high mechanical strength, high reliability (Weibull Modulus) and high fracture toughness.

2. Background Art

Silicon nitride ceramics are well known as materials capable of high strengths, high toughness values (relative to most ceramics), and high strength at temperatures above 1000° C. Silicon nitride ceramics also have high reliability relative to other ceramics, exhibited by a small variation of strengths when a large number of samples is tested. If the composition and microstructure are designed well, the material can be flaw tolerant. Strength variation and flaw tolerance are expressed by high Weibull modulus values. It is desirable to have high values for all three mentioned properties: strength, Weibull modulus and fracture toughness, and this has not been achieved simultaneously by prior art. It is also desirable to produce silicon nitride with these properties at a reasonable cost without the use of expensive densification techniques.

Silicon nitride with the above combination of properties would be very desirable for a variety of industrial applications where strength and reliability are important. Examples are cutting tools, ball bearings, dewatering paper segments, insulators for down-hole oil drilling, cam-roller followers or tappet shims, gun barrels, vehicle and personnel armor.

Silicon nitride toughness is a result of the material's intertwining needle-like grain structure, which can hinder the crack extension in the material by bridging the crack with intercepting grains. It is well known to anyone familiar with silicon nitride that the toughness is influenced by the nature and amount of the sintering aids used in the ceramic, the developed microstructure (grain width and length distribution) as well as the de-bonding ease at the silicon nitride grain and its grain boundary interface. State of the art silicon nitride materials typically have a fracture toughness values in the 5-7 MPa·m$^{1/2}$ range, and can have strengths ranging from 600 MPa to over 1000 MPa. Typically, however a compromise has to be reached between the two, since high fracture toughness requires a well developed network of large, reinforcing elongated grains in the microstructure, which then become strength limiting for the material. Additionally, due to these issues, even when high strength material can be made, occasional low strength specimens are encountered, reducing reliability and Weibull modulus.

The difficulty in attaining a combination of properties mentioned above can be seen in the prior art.

Li et al. (U.S. Pat. No. 5,637,540) teach a manufacturing method for silicon nitride material with fracture toughness values from 8 to 9.2 MPa·m$^{1/2}$, but report room temperature strengths between 650 and 866 MPa. The exact bar size is not reported. The invention further reports that the majority of fracture origins are long β-Si3N4 grains, reported to be approximately 28-40 μm in size. This disclosure teaches additions of at least two rare earth oxides in combination with SrO and metal carbides, that are densified to full density at above 1900° C., followed by an even higher temperature heat treatment.

Similarly, Li et al. (U.S. Pat. No. 5,449,649) show that while making silicon nitride with fracture toughness of 10.6 MPa·m$^{1/2}$ (example 3 in patent), this material's 4-point average bend strength is below 600 MPa.

Pujari (WIPO Patent Application WO 2008/080058) shows a single example of a silicon nitride material (coded N3 in application) with fracture toughness over 8.12 MPa·m$^{1/2}$ (measured using a non standard technique) with a strength of 841 MPa evaluated on MOR bars of unknown size but with length up to 12 mm. It is known that small bars have lower strength than larger ones. The same material composition processed for shorter times or different temperatures resulted in a stronger material but with toughness less than 6 MPa·m$^{1/2}$. This clearly shows the difficulty in attaining both high strength and toughness simultaneously in silicon nitride. The teachings of the above disclosure are based on silicon nitride with simultaneous additions of La$_2$O$_3$, Al$_2$O$_3$, Nd$_2$O$_3$, AlN, TiC and TiO$_2$, and the reinforcing grains are shown to be up to approximately 4 μm in size.

Quadir et al. (U.S. Pat. No. 5,030,599) teaches a method of manufacture of Si$_3$N$_4$ by adding at least three rare earth oxide sintering aids in addition to alumina to silicon nitride. However, the resulting strengths of the materials were below 650 MPa, and fracture toughness was not reported.

Becher et al. (J. Am. Ceram. Soc., 91 [7] 2328-2336) have reported that hot pressed strengths of over 1000 MPa (on small, non-standard bars) can be obtained on silicon nitride with 8% additions of La$_2$O$_3$, Gd$_2$O$_3$ or Lu$_2$O$_3$ with 2% MgO additions. Weibull moduli were not reported in the paper, however based on the reported standard deviations and mean values, and by using Monte Carlo simulations, the Weibull modulus was most likely below 10 in all three tested materials. All three of these materials were measured to have a high long crack (R-curve) toughness (10 to 12 MPa·m$^{1/2}$). The toughness was not measured using any of the standard ASTM C1421 techniques, therefore values can not be compared to other materials. In the reported micrographs, the largest reinforcing grains in the materials were up to about 5 μm.

Satet et al (J. Am. Ceram. Soc., 88 [9] 2485-2490) reported mean strengths of silicon nitride (with RE$_2$O$_3$, MgO and SiO$_2$ additions, where RE=Sc; Lu; Yb; Y; Sm or La) from approximately 900 to 1050 MPa, but the toughness was from 5.5 to 7.0 MPa·m$^{1/2}$ (using a standard method). The reinforcing grain length was up to 8 μm.

SUMMARY OF THE INVENTION

The present invention provides silicon nitride materials with high strength, fracture toughness values, and Weibull moduli simultaneously, due to unique large grain reinforcing microstructures and well engineered grain boundary compositions. The invention demonstrates that, surprisingly and contrary to prior art, a silicon nitride material can be made which simultaneously has high strength above about 850-900 MPa, a Weibull above about 15 and high fracture toughness (above about 8 and 9 MPa·m$^{1/2}$), and has reinforcing grains longer than 5 μm, typically longer than 10 μm in the microstructure without compromising its properties and reliability (FIG. 1, comprising FIGS. 1A and 1B). The product of this invention can be processed using a variety of densification methods, including gas-pressure sintering, hot pressing, hot isostatic pressing, but is not limited to these, and does not require multiple heat treatments for all of these features to be achieved.

According to one aspect of the invention, there is provided a silicon nitride dense body of at least 98% theoretical density and virtually pore free, consisting essentially of the following:

a. About 85-93 wt % of $\beta$-$Si_3N_4$;

b. With the remaining 5-15 wt % material, mostly contained within grain boundary phase, involving one or more selected rare earth atomic species in the total amount of about 4.0-12% (expressed as oxides) and about 0.5-3% total Mg, Ca, or Ba alkaline earth species (or mixtures thereof) expressed as oxides;

c. With the at least about 1% of one of the rare earth species (as oxide) selected from the list 1, and the remaining amount to be added as oxide can be chosen from list 1 or 2:

List 1: La, Gd, Ce, Sm, Nd, Pr, Yb, Eu

List 2: Lu, Y and Er

According to another aspect of the present invention, there are provided processes for sintering the silicon nitride at temperatures ranging from about 1600° C. to about 1950° C. for a time from about 1 hour to about 8 hours, with these values being approximate and requiring adjustment for the furnace type and size used, as known to the persons knowledgeable in the art. The sintering is carried out in a nitrogen containing atmosphere with sufficient pressure to suppress $Si_3N_4$ decomposition, and can be done by gas pressure sintering, hot pressing, hot isostatic pressing or pressureless sintering. This allows fabrication of materials with large shapes by hot pressing, or can be shaped by dry pressing, green machining or casting methods to near net shape and sintered. No additional post densification heat treatments are necessary to attain the combination of properties in this invention.

According to another aspect of the invention, the final microstructure of the material after tailoring a wide range of sintering cycles, contains evenly distributed elongated grains with lengths from about 5 μm to about 30-40 μm in size without substantially reducing the material strength.

According to the present invention, there is provided a silicon nitride ceramic body that has a fracture toughness greater than about 8 MPa·m$^{1/2}$ (by Chevron Notch technique), a four point bend strength of at least 900 MPa at room temperature, and a Weibull modulus of at least 15.

BRIEF DESCRIPTION OF THE DRAWINGS

The various embodiments, features and advances of the present invention will be understood more completely hereinafter as a result of a detailed description thereof in which reference will be made to the following drawings:

FIG. 1, comprising

DETAILED DESCRIPTION OF THE EMBODIMENTS

Figure 1A:
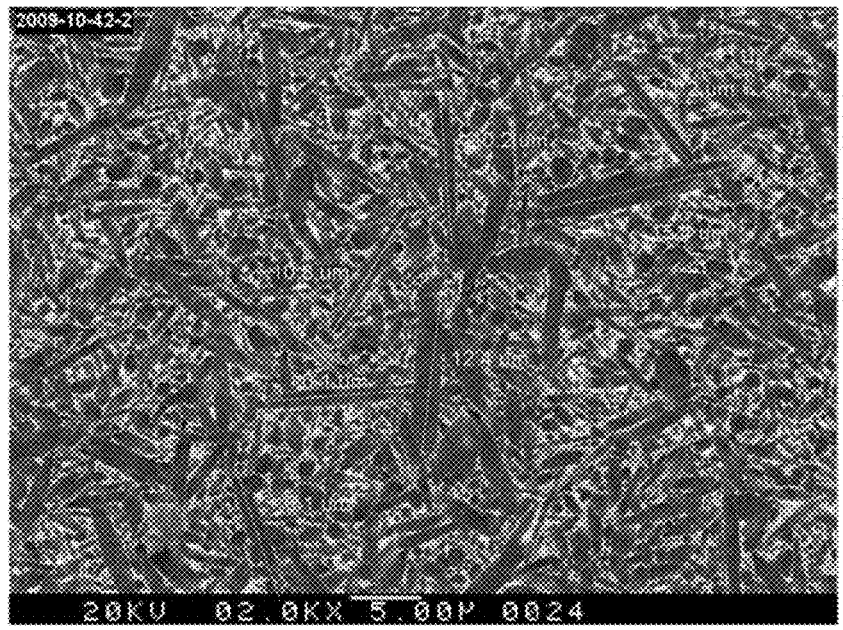
FIGS. 1A and 1B, are respective microphotographs of the structure of the silicon nitride material having the inventive features hereof.
Figure 1B:
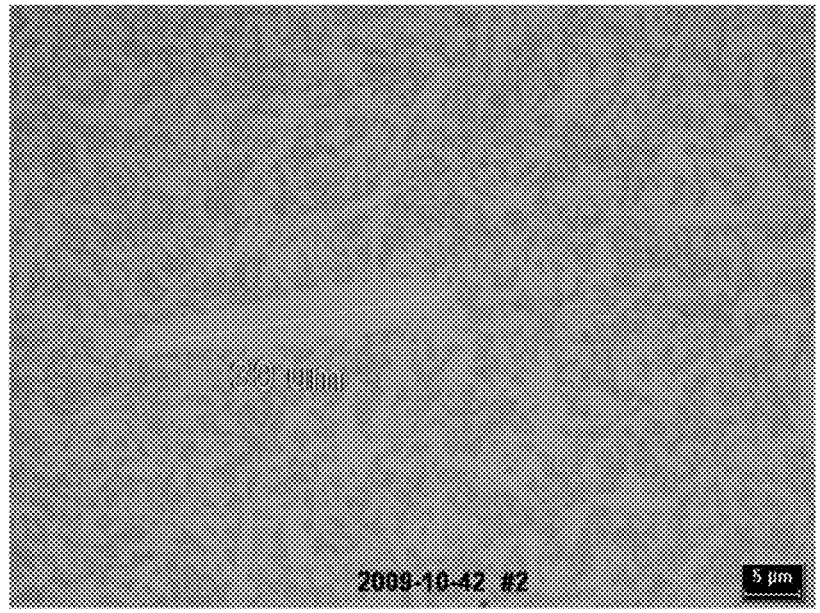

Three requirements have to be met concurrently to produce a high room temperature strength, high Weibull modulus and high toughness silicon nitride material:

1. the material has to be virtually pore free;
2. the microstructure of the $Si_3N_4$ needs to consist of interpenetrating elongated $\beta$-$Si_3N_4$ grains of tailored size distribution, aided by the chemically tailored grain boundary phase, and
3. the grain boundary phase needs to allow relatively easy de-bonding along the $\beta$-$Si_3N_4$ grains, allowing crack bridging and arresting to occur. If this de-bonding is not possible due to strong bonding between grains and the grain boundary phase, the cracks will travel indiscriminately through both without deflections, and strength and toughness will be low.

In general, the sintered body of the present invention is formed by sintering a composition comprising: 1) silicon nitride powder; and 2) at least one rare earth compound (preferably in form of an oxide—but not limited to this) from a selected list; and 3) at least one compound from the group of Mg, Ca or Ba, also preferably as an oxide, hydroxide, carbonate or similar.

In one embodiment of the material: 1) silicon nitride should be present from about 85 to about 93 wt %; 2) the total rare earth metals content (as oxides) should be about 4-12% and; 3) the total alkaline earths content (MgO+CaO+BaO) about 0.5-4 w %, calculated as starting powders. In addition, the rare earth metals need to contain at least about 1% of one of the rare earth species (as oxide) selected from the list 1, and the remaining amount to be added as oxide can be chosen from list 1 or 2:

List 1: La, Gd, Ce, Sm, Nd, Pr, Yb, Eu

List 2: Lu, Y and Er

The low limit of silicon nitride content prevents serious degradation of material properties by increasing the amount of grain boundary phases, and the high limit allows the material to sinter to full density at practical temperatures, as the oxide additives act as sintering aids. The selection of the rare earth oxide additions is made as described to allow effective de-bonding between the $\beta$-$Si_3N_4$ grains and the grain boundary. The powders mixed according to the above description, can be pressed into desired shapes and densified in nitrogen atmosphere in a gas pressure furnace using two levels of gas pressure at temperatures from about 1600° C. to about 1950° C. for about 1 to about 8 hours. Instead of gas pressure sintering, hot isostatic pressing, hot pressing or pressureless sintering can be used under similar conditions.

It has been found that any (rare earth) RE-oxide from List 1 (or their mixtures) with other additions, result in grain boundaries that easily de-bond along $Si_3N_4$ grains.

Unexpectedly, the inventors hereof have found that rare earth oxide additions solely from list 2, in combination with MgO, form a grain boundary that bonds strongly with the silicon nitride grains, causing low fracture toughness as well as low strength. This was observed despite a well developed microstructure with elongated grains.

Even more surprisingly, the inventors have found that if the RE oxides from List 2 are combined with at least about 1 w % of oxides from list 1, the resulting grain-boundary phase de-bonding along the $Si_3N_4$ grains occurs again, resulting in high fracture toughness.

Another unexpected result of this invention is that the strength and fracture toughness of the described compositions are very stable and do not change measurably if the sintering temperature is changed by as much as 150° C., in contrast to prior art and practice.

In this embodiment the material properties are as follows: characteristic strength greater than 850 MPa, fracture toughness (Chevron Notch) greater than about 7.5 MPa·m$^{1/2}$ and Weibull modulus greater than about 15. The microstructure of the materials consists of elongated $Si_3N_4$ grains with the largest reinforcing grains ranging from about 5 to about 40 µm in length.

In a preferred embodiment of the material: 1) silicon nitride should be present from about 89 to about 95 wt %; 2) the total rare earth metals (as oxides) content should be about 4-10%; and 3) the total alkaline earths content (MgO+CaO+BaO) about 0.5-3 w %, calculated as starting powders. In addition, the rare earth metals need to contain at least about 0.5% of one of the rare earth species (as oxide) selected from the list 1, and the remaining amount to be added as oxide can be chosen from list 1 or 2:

List 1: La, Gd, Ce, Sm, Nd, Pr, Yb, Eu
List 2: Lu, Y and Er

The low limits of silicon nitride content are there to prevent serious degradation of material properties by increasing the amount of grain boundary phases, and the high limits are to allow the material to sinter to full density at practical temperatures, as the oxide additives act as sintering aids. The selection of the rare earth oxide additions is made as described to allow effective de-bonding between the β-$Si_3N_4$ grains and the grain boundary. The powders mixed according to the above description, can be pressed into desired shapes and densified in nitrogen atmosphere in a gas pressure furnace using two levels of gas pressure at temperatures from about 1700° C. to about 1950° C. for about 1-about 8 hours. Instead of gas pressure sintering, hot isostatic pressing, hot pressing or pressureless sintering can be used under similar conditions.

Grain boundary phases in the compositions of this invention, when cooled naturally after sintering, can be amorphous or crystalline, depending on the rare earth metal being used as a sintering aid. The degree of crystallinity of the grain boundary phases can be increased by post sintering heat treatments to improve high temperature properties of the material, but this is not necessary for the room temperature strength and toughness. High temperature properties may require optimized post heat treatment and this would not be a departure from the teachings of this invention.

It is evident that further optimization of properties can be achieved by modifying the composition ratios of the rare earths and alkaline earth compounds within the defined range, as well as the processing conditions, including potential post densification treatments, without departing from the invention.

It is also evident that the compositions of this invention can be obtained using different starting materials, without departing from the teachings of the invention. For instance, silicon nitride powder can be used as a starting material, but also Si powder can be used instead, followed by a nitriding step. Also, the sintering aids can be added as oxides, hydroxides, carbonate or similar compounds that will yield oxides after the sintering heat treatment. Additions can be made in a form of finely dispersed powders, or as metal salt solutions in water in some cases. Other combinations of compounds and other methods of applying them are also possible without deviating from the invention.

Since strength and fracture toughness can be measured using different sample sizes and different methods, which can not be directly compared, it is important to define measurement methods used in this invention. For strength evaluation, ASTM C1161 method with B size bars was used, with a 4 point loading with a 40/20 mm spans. Fracture toughness was measured using ASTM C1421 with Chevron Notch type A bars. Weibull moduli were calculated using maximum likelihood estimation methodology using a minimum of 15 broken bars, in most cases 30 bars. In addition Vickers hardness at a 5 kg·f load (HV5) was measured. Thermal conductivity of selected samples was measured using the laser flash method.

In the following examples, these raw powders were used:

$Si_3N_4$ from Ube, SN-E10 grade with a specific surface area (SSA) of about 10 m$^2$/g and oxygen content of about 1.5%

Rare earth oxide powders with 99.9% or higher purity:

$Nd_2O_3$ powder with SSA of 9.5 m$^2$/g $Er_2O_3$ powder 1 with SSA of 1 m$^2$/g $Er_2O_3$ powder 2 with SSA of 5 m$^2$/g $Sm_2O_3$ powder with 3 m$^2$/g $Pr_2O_3$ powder with SSA 2.5 m$^2$/g $CeO_2$ powder with SSA 10 m$^2$/g $La_2O_3$ powder with SSA 5 m$^2$/g $Gd_2O_3$ powder with SSA 2.4 m$^2$/g $Y_2O_3$ powder with SSA of 15 m$^2$/g $Lu_2O_3$ with SSA 4 m$^2$/g MgO powder with SSA of 15 m$^2$/g Powders batches were mixed by weighing appropriate amounts of powders for the composition to be made and by dispersing them in alcohol in a ball mil. The powder slurry was ball milled for 16 hours using $Si_3N_4$ milling media. The slurry was then poured out of the mill though a 325 mesh screen and was dried in a distillery set-up. Dried powder was screened though a 60 mesh nylon screen, and stored in a labeled plastic container.

EXAMPLES 1-8

Powders batches in Table 1 were mixed as described above. Batched powders from Table 1 were weighed and loaded in a hot press graphite die (10 cm×10 cm size). Graphite tooling was coated with BN slurry. Four different billets were stacked in one die and the die was loaded into a hot press. The hot press runs were performed in a flowing nitrogen atmosphere at maximum temperatures indicated in Table 2, and the applied pressure was 10.3 MPa (1500 psi). After the run was cooled, billets were separated from the tooling, and were cleaned. Density was measured by water displacement, and then the MOR bars and Chevron notch bars were made from the material to evaluate its properties. Table 2 shows the results of property measurements.

TABLE 1

| Composition Code | $Si_3N_4$ (wt %) | REO | MgO (wt %) |
|---|---|---|---|
| PR8-2 | 90 | 8 ($Pr_2O_3$) | 2 |
| YB8-2 | 90 | 8 ($Yb_2O_3$) | 2 |
| SM8-2 | 90 | 8 ($Sm_2O_3$) | 2 |
| CE8-2 | 90 | 8 ($CeO_2$) | 2 |

Compositions (header spanning REO column)

TABLE 2

| Exp. # | Comp Code | Max temp (° C.)/ 30 min | Characteristic Strength (MPa) | Weibull | Kic (MPa·m$^{1/2}$) | Thermal Conductivity (W/m·K) |
|---|---|---|---|---|---|---|
| 1 | PR8-2 | 1850 | 1030 | 16 | 9.3 | 46 |
| 2 | YB8-2 | 1850 | 1048 | 9 | 9.3 | 52 |
| 3 | SM8-2 | 1850 | 1020 | 31 | 9.6 | 54 |
| 4 | CE8-2 | 1850 | 1107 | 22 | 9.8 | 46 |
| 5 | PR8-2 | 1900 | 1012 | 16 | 12.8 | 55 |
| 6 | YB8-2 | 1900 | 814 | 9 | 9.9 | 65 |
| 7 | SM8-2 | 1900 | 1008 | 22 | 9.2 | 56 |
| 8 | CE8-2 | 1900 | 1090 | 18 | 9.3 | 66 |

EXAMPLES 9-16

Powders batches in Table 3 were mixed as described earlier. Powders from Table 3 were weighed and loaded in a hot press graphite die (10 cm×10 cm size). Graphite tooling was coated with BN slurry. Four different billets were stacked in one die and the die was loaded into a hotpress. The hot press runs were performed in a flowing nitrogen atmosphere at maximum temperatures indicated in Table 4, and the applied pressure was 10.3 MPa (1500 psi). After the run was cooled, billets were separated from the tooling, they were cleaned. Density was measured by water displacement, and then the MOR bars and Chevron notch bars were made from the material to evaluate its properties. Table 4 shows the results of property measurements.

TABLE 3

| Compositions | | | |
|---|---|---|---|
| Composition Code | Si$_3$N$_4$ (wt %) | REO | MgO (wt %) |
| GD8-2 | 90 | 8 (Gd2O3) | 2 |
| ER(1)8-2 | 90 | 8 (Er2O3 powder 1) | 2 |
| ND8-2 | 90 | 8 (Nd2O3) | 2 |
| ER(2)8-2 | 90 | 8 (Er2O3 powder 2) | 2 |

Examples 9-12 show lower strength and fracture values for several compositions due to a short time at the 1800° C., which did not allow the desired microstructure to be developed in the material.

TABLE 4

| Exp. # | Comp Code | Max temp (° C.) | Characteristic Strength (MPa) | Weibull | KiC (MPa·m$^{1/2}$) | Thermal Cond. (W/m·K) |
|---|---|---|---|---|---|---|
| 9* | GD8-2 | 1800/30 min | 1051 | 12 | 7.5 | 46 |
| 10* | ER(1)8-2 | 1800/30 min | 846 | 12 | 5.2 | 52 |
| 11* | ND8-2 | 1800/30 min | 986 | 7.5 | 7.3 | 51 |
| 12* | ER(2)8-2 | 1800/30 min | 918 | 22 | 5.7 | 45 |
| 13 | GD8-2 | 1850/60 min | 978 | 20 | 8.8 | 63 |
| 15 | ND8-2 | 1850/60 min | 979 | 20 | 9.5 | 60 |
| 16 | ER(2)8-2 | 1850/60 min | 894 | 15 | 8.2 | 67 |

EXAMPLES 17-20

Powder compositions made in Table 1 were dry-pressed in a 10×10 cm steel die, followed by isopressing after sealing the part in a plastic bag. The parts were then sintered in a hot isostatic gas pressure sintering furnace at 1850° C., with 2 hours at low nitrogen pressure 1400 KPa (200 psi) followed by 1 hour at 277 MPa (30 Kpsi) pressure. All the materials achieved densities of over 98% of theoretical density. Table 5 shows the properties measured on the material from this run.

TABLE 5

| HIP run data | | | | | | |
|---|---|---|---|---|---|---|
| Exp. # | Comp Code | Ch. Str (MPa) | Weibull | Kic (MPa·m$^{1/2}$) | Hardness (GPa) | Density (g/cm$^3$) |
| 17 | PR8-2 | 888 | 26 | 8.2 | 15.1 | 3.312 |
| 18 | YB8-2 | 865 | 15 | 8.1 | 15.1 | 3.362 |
| 19 | SM8-2 | 926 | 29 | 8.1 | 14.9 | 3.323 |
| 20 | CE8-2 | 917 | 22 | 8.2 | 14.7 | 3.319 |

Examples 17 to 20 demonstrate that two stage hot isostatic pressing techniques can be used to successfully densify the compositions of this invention with high strength, Weibull modulus and fracture toughness values. Further optimization and property improvement are possible by optimizing the run parameters as well as powder processing techniques, without deviations from the teachings of the invention.

EXAMPLES 21-31

Powder batches in Table 6 were mixed as described earlier. Powders from Table 6 were weighed and loaded in a hot press graphite die (10 cm×10 cm size). Graphite tooling was coated with BN slurry. Four different billets were stacked in one die and the die was loaded into a hotpress. The hotpress runs were performed in a flowing nitrogen atmosphere at a maximum temperatures indicated in Table 7, and the applied pressure was 10.3 MPa (1500 psi). After the run was cooled, billets were separated from the tooling, they were cleaned. Density was measured by water displacement, and then the MOR bars and Chevron notch bars were made from the material to evaluate its properties. Table 7 shows the results of property measurements.

TABLE 6

| | Compositions | | |
|---|---|---|---|
| Composition Code | $Si_3N_4$ (wt %) | REO | MgO (wt %) |
| LA8-2 | 90 | 8 ($La_2O_3$) | 2 |
| GD8-2 | 90 | 8 ($Gd_2O_3$) | 2 |
| Y8-2 | 90 | 8 ($Y_2O_3$) | 2 |
| LU8-2 | 90 | 8 ($Lu_2O_3$) | 2 |

In Table 7, examples 23, 24, 27, 28 and 31 are comparative examples showing that additions of solely $Y_2O_3$ or $Lu_2O_3$ with MgO result in materials with low fracture toughness and low strength. It should also be noticed that the strength of both compositions (Y8-2 and LU8-2) decreases when the peak temperature is increased, due to grain growth. Strong bonding between the $\beta$-$Si_3N_4$ grains and the grain boundary phases is responsible for this behavior, based on crack extension paths observed in these materials. This is a result of the distribution of La and Y cation species along the grain boundaries, thereby effecting the de-bonding.

More importantly, Table 7 shows that all examples with La and Gd additives result in very strong, reliable and very tough materials, and that the these properties are not substantially affected by the processing temperature even though different by 125° C., which is surprising. These additives, in combination with MgO form grain boundary phases that allow easy de-bonding along the elongated $\beta$-$Si_3N_4$ grains. Also, in all these materials, the resulting microstructure contains large reinforcing grains from about 5 to about 40 μM in length.

EXAMPLES 31-37

Powders batched in Table 8 were mixed as described earlier. Powders from Table 8 were weighed and loaded in a hot press graphite die (10 cm×10 cm size). Graphite tooling was coated with BN slurry. Four different billets were stacked in one die and the die was loaded into a hotpress. The hot press runs were performed in a flowing nitrogen atmosphere at a maximum temperature indicated in Table 9, and the applied pressure was 10.3 MPa (1500 psi). After the run was cooled, billets were separated from the tooling, and they were cleaned. Density was measured by water displacement, and then the MOR bars and Chevron notch bars were made from the material to evaluate its properties. Table 9 shows the results of property measurements.

TABLE 8

| | Compositions | | |
|---|---|---|---|
| Composition Code | $Si_3N_4$ (wt %) | REO % | MgO (wt %) |
| LALU44-2 | 90 | 4 ($La_2O_3$) | 2 |
| | | 4 ($Lu_2O_3$) | |
| CE8-2 | 90 | 8 ($CeO_2$) | 2 |
| ND-2 | 90 | 8 ($Nd_2O_3$) | 2 |
| CELU8-2 | 90 | 4 ($CeO_2$) | 2 |
| | | 4 ($Lu_2O_3$) | |

Table 9 shows that all additives in Table 8 result in very strong, reliable and tough materials, and that these properties are not affected by the processing temperature even though different by 125° C., which is surprising.

Additionally, when Yttrium and Lutetium oxide additives (which on their own result in low toughness and strength materials) are combined with Lanthanum or Cerium additives, the toughness is restored, as well as strength and Weibull moduli. In all cases, the de-bonding between the grains and grain boundary phase is observed. This is also an unexpected result of this invention.

TABLE 7

| Exp. # | Comp Code | Max temp (° C.)/2 hrs | Ch. Str (MPa) | Weibull | KiC (MPa · $m^{1/2}$) | Hardness (GPa) | Debonding observed |
|---|---|---|---|---|---|---|---|
| 21 | LA8-2 | 1825 | 987 | 26 | 9.1 | 15 | Yes |
| 22 | GD8-2 | 1825 | 974 | 21 | 9.2 | 15 | Yes |
| 23* | Y8-2 | 1825 | 765 | 7.5 | 6.8 | 15 | Poor |
| 24* | LU8-2 | 1825 | 701 | 4.7 | 4.6 | 15.4 | Poor |
| 25 | LA8-2 | 1875 | 1005 | 18 | 9.0 | 15.6 | Yes |
| 26 | GD8-2 | 1875 | 1001 | 22 | 9.0 | 16.0 | Yes |
| 27* | Y8-2 | 1875 | 634 | 9.2 | 4.9 | 16.3 | Poor |
| 28* | LU8-2 | 1875 | 688 | 8.7 | 4.5 | 16.2 | Poor |
| 29 | LA8-2 | 1750 | 1011 | 16.1 | 7.6 | — | Yes |
| 30 | GD8-2 | 1750 | 1022 | 16.8 | 8.5 | — | Yes |
| 31* | LU8-2 | 1750 | 704 | 15.7 | 4.2 | — | Poor |

TABLE 9

| Exp. # | Comp Code | Max temp (° C.)/2 hrs | Ch. Str (MPa) | Weibull | KiC (MPa·m^{1/2}) | Hardness (GPa) | Debonding observed |
|---|---|---|---|---|---|---|---|
| 31 | LALU44-2 | 1800 | 1069 | 18.7 | 9.7 | 15.5 | Yes |
| 32 | LALU44-2 | 1750 | 1034 | 15.7 | 8.4 | | yes |
| 33 | ND-2 | 1800 | 955 | 15 | 8.5 | 15.5 | Yes |
| 34 | CELU8-2 | 1800 | 1001 | 15.1 | 9 | 15.5 | Yes |
| 35 | LALU44-2 | 1875 | 1007 | 15 | 9.1 | 15.5 | Yes |
| 36 | ND-2 | 1875 | 971 | 15.5 | 9.4 | 15.6 | Yes |
| 37 | CELU8-2 | 1875 | 936 | 16 | 9.1 | 15.5 | Yes |

EXAMPLES 38-45

Powder batches in Table 10 were mixed as described earlier.

For examples 38-41, powders from Table 10 were weighed and loaded in a hot press graphite die (10 cm×10 cm size). Graphite tooling was coated with BN slurry. Four different billets were stacked in one die and the die was loaded into a hot press. The hot press runs were performed in a flowing nitrogen atmosphere at a maximum temperature indicated in Table 11, and the applied pressure was 1500 psi. After the run was cooled, billets were separated from the tooling, and they were cleaned. Density was measured by water displacement, and then the MOR bars and Chevron notch bars were made from the material to evaluate its properties. Table 11 shows the results of property measurements.

For examples 42-45, powders from Table 10 were weighed, pressed in a steel die to form a 100×100×15 mm pre-form, followed by sealing in a bag and isopressing at 140 MPa. Parts were removed from the bags and placed in a graphite crucible with sacrificial packing powder. Parts were heated in nitrogen atmosphere (@ 700 KPa) to a maximum temperature (Table 10) and held there for 3 hrs. Gas pressure was then increased to 10.3 MPa for 2 hrs, followed by cooling. Pressure was released at room temperature and the parts removed and cleaned. Density was measured by water displacement, and then the MOR bars and Chevron notch bars were made from the material to evaluate its properties. Table 11 shows the results of property measurements.

TABLE 10

| | Compositions | | |
|---|---|---|---|
| Composition Code | Si$_3$N$_4$ (wt %) | La$_2$O$_3$ % | MgO (wt %) |
| LA4-.5 | 95.5 | 4 | 0.5 |
| LA4-2 | 94 | 4 | 2 |
| LA6-1 | 93 | 6 | 1 |
| LA4-1 | 95 | 4 | 1 |

Table 11 shows that all additives in Table 10 result in very strong, reliable and tough materials processed both by hot pressing and by gas pressure sintering. Examples 42-45 showed a lightly lower strength in gas pressure sintering, but this can be improved by slight changes in processing conditions that would not deviate from the teachings of the invention. Examples 38-43 show that ratios of La and Mg additions can be modified while retaining the material properties. It is clear to any one knowledgeable in the art that additional improvements to the reported properties can be achieved by further optimization of compositions and processing of these material without departing from the teaching of the invention.

TABLE 11

| Exp. # | Comp Code | Max temp (° C.) hrs | Density | Ch. Str (MPa) | Weibull | KiC (MPa·m^{1/2}) | Debonding observed |
|---|---|---|---|---|---|---|---|
| 38 | LA4-.5 | 1800 | >99% | 863 | 10.9 | 8.6 | Yes |
| 39 | LA4-2 | 1800 | >99 | 977 | 20.9 | 8.7 | Yes |
| 40 | LA6-1 | 1800 | >99 | 870 | 25.5 | 7.7 | Yes |
| 41 | LA4-1 | 1800 | >99 | 880 | 31.5 | 8.7 | Yes |
| 42 | LA4-.5 | 1875 | 99 | 840 | | | Yes |
| 43 | LA4-2 | 1875 | >99 | 849 | 19.9 | 8.7 | Yes |
| 44 | LA6-1 | 1875 | 99 | 840 | 18 | 8.5 | Yes |
| 45 | LA4-1 | 1875 | 99 | 855 | 15.5 | 8.4 | Yes |

EXAMPLES 46-49

Powder batches in Table 12 were mixed as described earlier.

Powders from Table 12 were weighed and loaded in a hot press graphite die (10 cm×10 cm size). Graphite tooling was coated with BN slurry. Four different billets were stacked in one die and the die was loaded into a hot press. The hot press runs were performed in a flowing nitrogen atmosphere at a maximum temperature indicated in Table 11, and the applied pressure was 1500 psi. After the run was cooled, billets were separated from the tooling, and they were cleaned. Density was measured by water displacement, and then the MOR bars and Chevron notch bars were made from the material to evaluate its properties. Table 11 shows the results of property measurements.

For examples 42-45, powders from Table 10 were weighed, pressed in a steel die to form a 100×100×15 mm pre-form, followed by sealing in a bag and isopressing at 140 MPa. Parts were removed from the bags and placed in a graphite crucible with sacrificial packing powder. Parts were heated in nitrogen atmosphere (@ 700 KPa) to a maximum temperature (Table 10) and held there for 3 hrs. Gas pressure was then increased to 10.3 MPa for 2 hrs, followed by cooling. Pressure was released at room temperature and the parts removed and cleaned. Density was measured by water displacement, and then the MOR bars and Chevron notch bars were made from the material to evaluate its properties. Table 11 shows the results of property measurements.

TABLE 12

| Composition Code | Si$_3$N$_4$ (wt %) | La$_2$O$_3$ % | Lu$_2$O$_3$ | Y$_2$O$_3$ | MgO (wt %) |
|---|---|---|---|---|---|
| LALU13-0.5 | 95.5 | 1 | 3 | 0 | 0.5 |
| LALU26-2 | 90 | 2 | 6 | 0 | 2 |
| LAY13-2 | 94 | 1 | 0 | 3 | 2 |
| LA16-1 | 92 | 1 | 0 | 6 | 1 |

Table 12 shows that all additives in Table 12 result in very strong, reliable and tough materials. Examples 46-49 additionally show that additions of only 1% of La$_2$O$_3$ to a range of compositions with Lu$_2$O$_3$ and Y$_2$O$_3$ (which on their own would have a low strength and toughness) considerably improves their properties. It is clear to any one knowledgeable in the art that additional improvements to the reported properties can be achieved by further optimization of compositions and processing of these material without departing from the basic ideas and bounds of the invention.

TABLE 12

| Exp. # | Comp Code | Max temp (° C.) hrs | Density | Ch. Str (MPa) Hot Pressing | Weibull | Kic (MPa · m$^{1/2}$) | Hardenss (GPa) | Debonding observed |
|---|---|---|---|---|---|---|---|---|
| 46 | LALU13-0.5 | 1800 | >99% | 991 | 13 | 8.1 | 15.5 | Yes |
| 47 | LALU26-2 | 1800 | >99 | 1004 | 15.9 | 9.2 | 15.4 | Yes |
| 48 | LAY13-2 | 1800 | >99 | 1010 | 26 | 9.1 | 15.3 | Yes |
| 49 | LA16-1 | 1800 | >99 | 977 | 20 | 9.6 | 15.5 | yes |

Having disclosed various and preferred embodiments of the invention herein, it being understood that the numerous examples described are not exhaustive representations of the methods and results having the features deemed to be within the scope of the invention herein, what we claim is the following:

The invention claimed is:

1. A silicon nitride body having at least 99% of theoretical maximum density, being substantially free of pores, produced in a single high temperature heat treatment step and comprising:
   about 85% to about 95% by weight of β-Si$_3$N$_4$; and
   the remainder of material being contained primarily in grain boundary phase; and being about 4% to 12% by weight of at least one rare earth metal oxide and up to about 3% by weight of at least one alkaline earth oxide;
   wherein said rare earth oxide consists of at least 0.5% by weight of said body selected from the group consisting of La, Gd, Ce, Sm, Nd, Pr, Yb and Eu and the remaining rare earth oxide material is selected from the group consisting of La, Gd, Ce, Sm, Nd, Pr, Yb, Eu, Lu, Y and Er;
   wherein said alkaline earth oxide consists of at least one selected from the group of oxides consisting of Mg, Ca, and Ba and mixtures thereof; and
   wherein the β-Si$_3$N$_4$ constitutes predominantly elongated grains, the longest of which are greater than 10 micrometers and up to 40 micrometers in length;
   wherein a microstructure section of 2419 micrometers squared contains a plurality of elongated grains that are longer than 10 μm.

2. The silicon nitride body recited in claim 1 wherein said body has a strength greater than 850 MPa, a fracture toughness above 7.5 MPa·m$^{1/2}$ and a Weibull modulus greater than 15.

3. The silicon nitride body recited in claim 1 wherein said at least one rare earth oxide has a purity of at least 99.9%.

4. The silicon nitride body recited in claim 1 wherein the thermal conductivity of the material is at least 50 W/mK.

5. A silicon nitride body having at least 99% of theoretical maximum density, being substantially pore free, processed in a single high temperature heat treatment step, and comprising:
   a sintered composition of crystalline silicon nitride, and amorphous or crystalline silicon oxynitride grain boundary, said boundary containing at least one rare earth metal and at least one alkaline earth element as the only added elements;
   the silicon nitride being from about 85% to about 95% by weight of the final material and having a microstructure including interpenetrating elongated β-Si$_3$N$_4$ reinforcing grains with a grain boundary phase that permits de-bonding along the β-Si$_3$N$_4$ grains;
   the longest reinforcing β-Si$_3$N$_4$ grains therein being greater than 12 micrometers and up to 40 micrometers in length;
   the said silicon nitride body having strength greater than 850 MPa, a fracture toughness greater than 7.5 MPa·m$^{1/2}$ and a Weibull modulus greater than 15.

6. The silicon nitride body recited in claim 5 wherein said at least one rare earth metal compound comprises an oxide taken from the group of oxides of the metals La, Gd, Ce, Sm, Nd, Pr, Yb, Eu, Lu, Y and Er.

7. The silicon nitride body recited in claim 5 wherein said at least one alkaline earth compound comprises at least one of the group consisting of an oxide, hydroxide or carbonate of Mg, Ca or Ba.

8. The silicon nitride body recited in claim 5 wherein said elongated β-Si$_3$N$_4$ reinforcing grains are over 15 μm in length.

9. A silicon nitride body having at least 99% of theoretical maximum density, being substantially pore free and comprising:
   a sintered composition of crystalline silicon nitride, and amorphous or crystalline silicon oxynitride grain boundary, said boundary containing at least one rare earth metal and at least one alkaline earth element;
   the silicon nitride being from about 85% to about 95% by weight of the final material and having a microstructure including interpenetrating elongated β-Si$_3$N$_4$ reinforcing grains with a grain boundary phase that permits de-bonding along the β-Si$_3$N$_4$ grains;
   the said silicon nitride body having strength greater than 850 MPa, a fracture toughness greater than 7.5 MPa·m$^{1/2}$ and a Weibull modulus greater than 15, said silicon nitride body being subjected to a single high temperature heat treatment;

wherein said elongated β-Si$_3$N$_4$ reinforcing grains are greater than 20 micrometers and up to 40 micrometers in length.

10. The silicon nitride body recited in claim 5 wherein said at least one rare earth oxide has a purity of at least 99.9%.

11. The silicon nitride body recited in claim 5 wherein said material has a thermal conductivity of at least 50 W/mK.

12. A silicon nitride body having at least 99% of theoretical maximum density, being substantially free of pores, produced in a single high temperature heat treating step and comprising:
   about 85% to about 93% by weight of β-Si3N4; and
   the remainder of material being contained primarily in grain boundary phase and being about 4% to 12% by weight of combined at least two rare earth metal oxides and up to about 3% by weight of at least one alkaline earth oxide;
   wherein the first rare earth oxide consists of at least about 1% by weight of said body selected from the group consisting of La, Gd, Ce, Sm, Nd, Pr, Yb and Eu and the second (different than the first) and all subsequent rare earth oxides are selected from the group consisting of La, Gd, Ce, Sm, Nd, Pr, Yb, Eu, Lu, Y and Er;
   wherein said alkaline earth oxide consists of at least one selected from the group of oxides consisting of Mg, Ca, and Ba and mixtures thereof; and
   wherein the β-Si$_3$N$_4$ constitutes predominantly elongated grains, the longest of which are greater than 5 μm in length; and
   wherein the material has a strength of greater than 850 MPa.

13. The silicon nitride body recited in claim 12 wherein said body has a fracture toughness above 7.5 MPa·m$^{1/2}$ and a Weibull modulus greater than 15.

14. The silicon nitride body recited in claim 12 wherein said at least one rare earth oxide has a purity of at least 99.9%.

15. The silicon nitride body recited in claim 12 wherein the thermal conductivity of the material is at least 50 W/mK.

* * * * *